(No Model.) 4 Sheets—Sheet 1.
C. J. VAN DEPOELE.
CABLE CONVEYANCE.
No. 331,851. Patented Dec. 8, 1885.
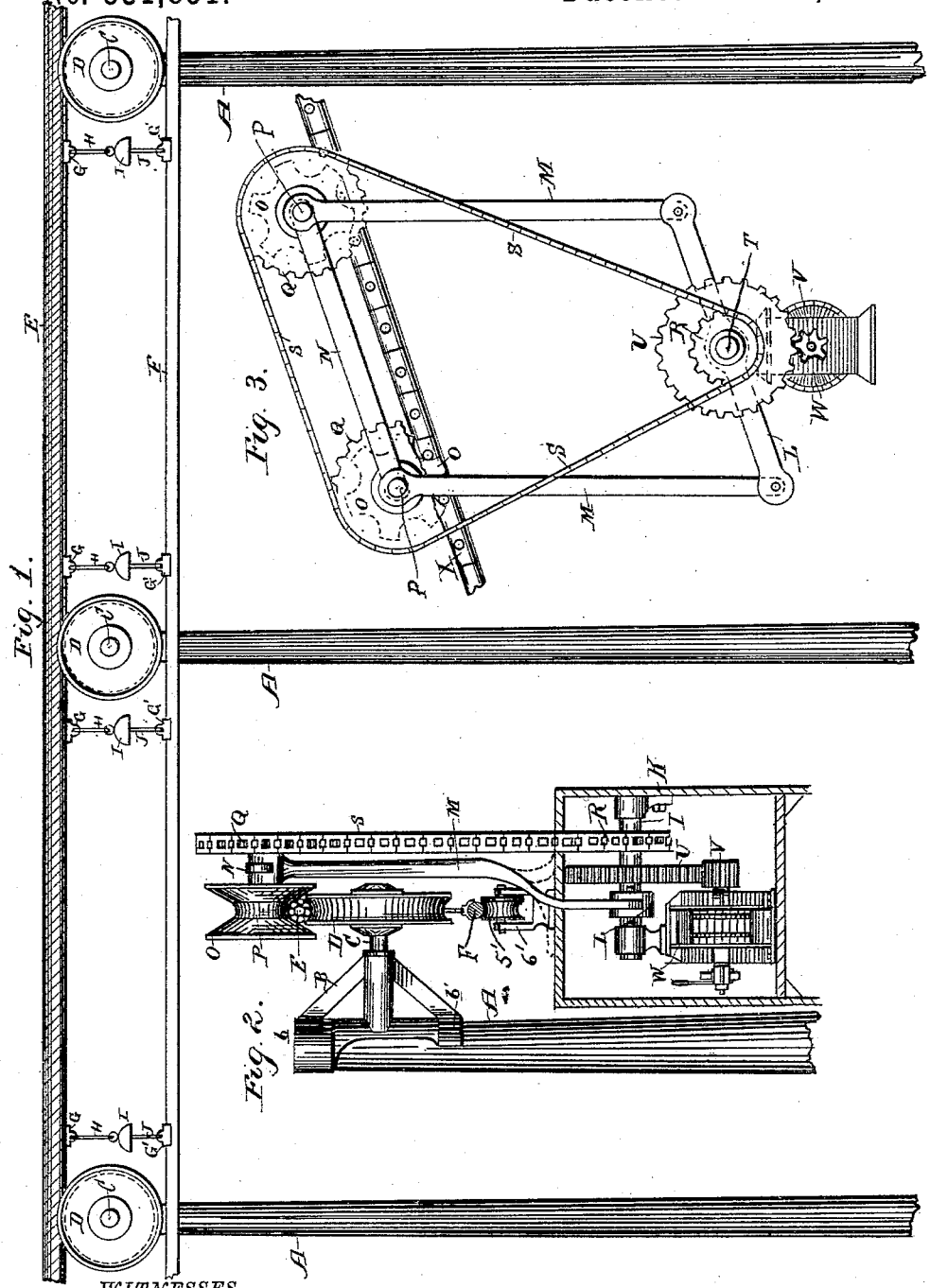
WITNESSES
Will T. Robertson
E. H. Bond
INVENTOR
Charles J. Van Depoele
By T. J. W. Robertson
Attorney (No Model.) 4 Sheets—Sheet 2.
C. J. VAN DEPOELE.
CABLE CONVEYANCE.
No. 331,851. Patented Dec. 8, 1885.
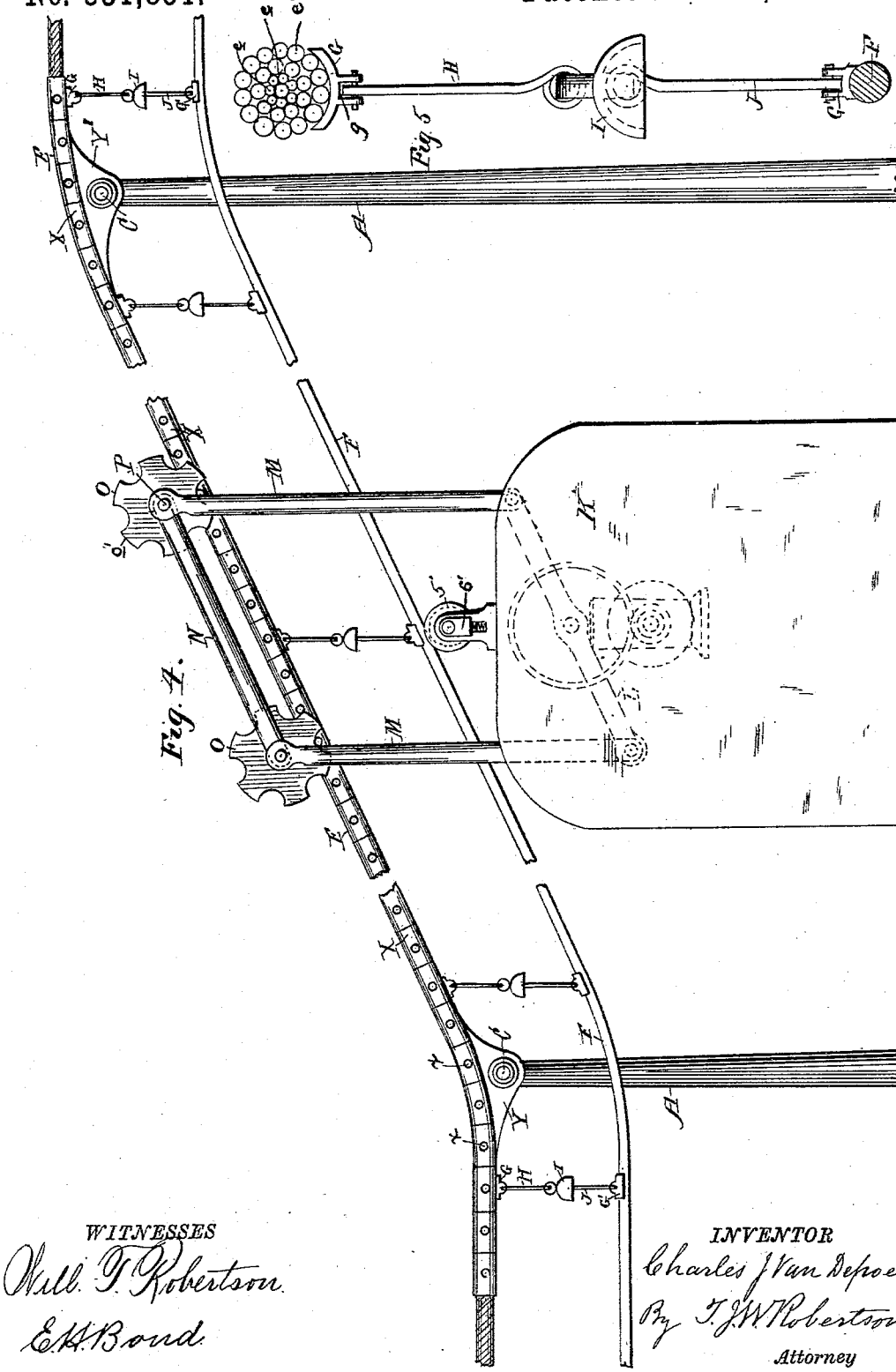
WITNESSES
Will. T. Robertson.
E. H. Bond.
INVENTOR
Charles J Van Depoele
By T. J. W. Robertson
Attorney

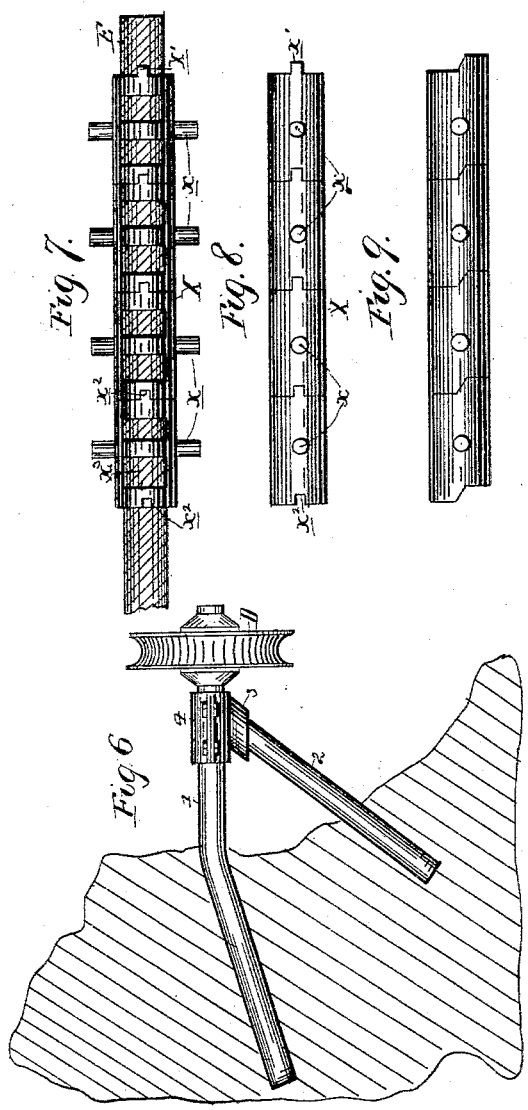

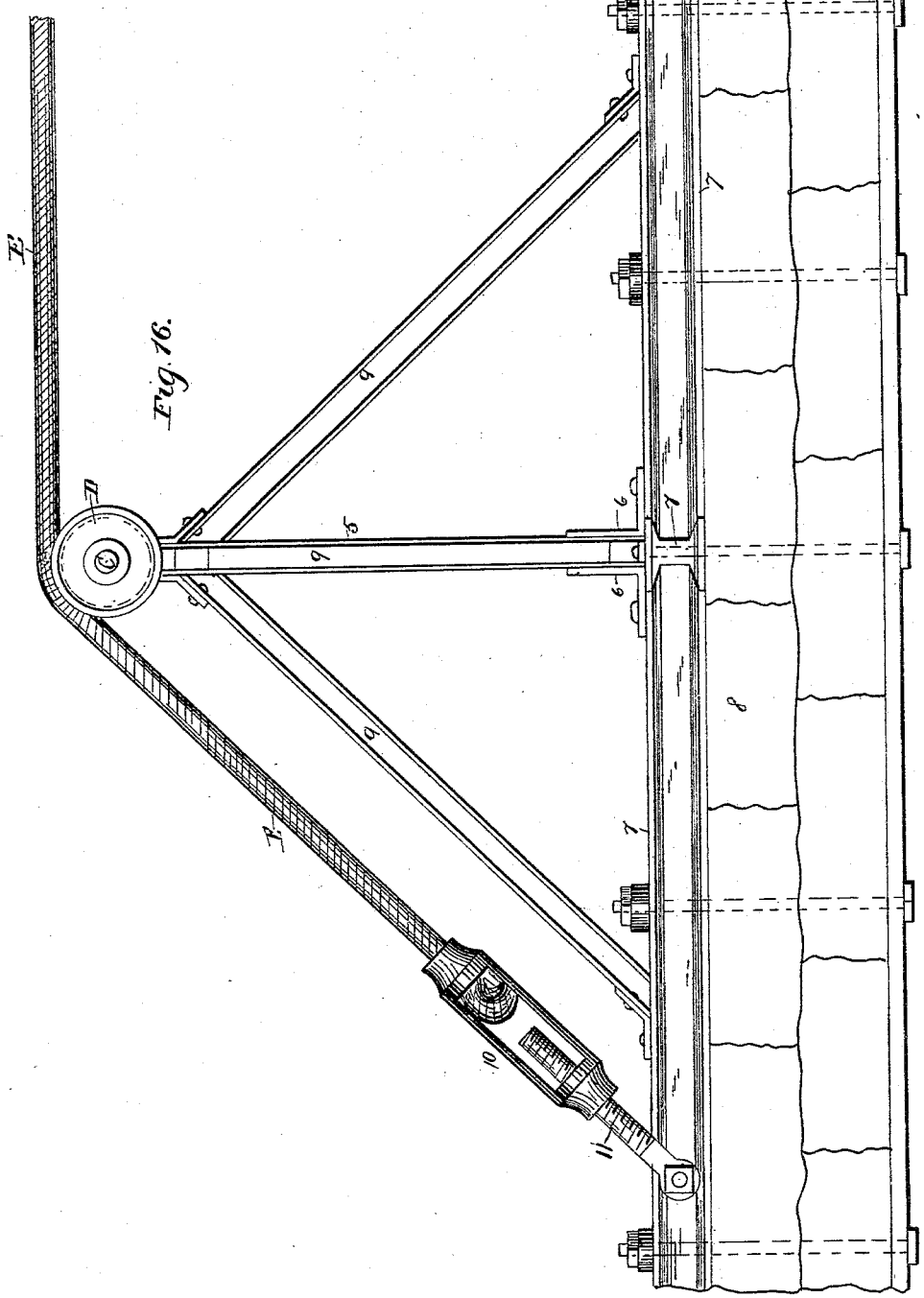

UNITED STATES PATENT OFFICE.

CHARLES J. VAN DEPOELE, OF CHICAGO, ILLINOIS.

CABLE CONVEYANCE.

SPECIFICATION forming part of Letters Patent No. 331,851, dated December 8, 1885.

Application filed July 31, 1885. Serial No. 173,190. (No model.)

*To all whom it may concern:*

Be it known that I, CHARLES J. VAN DEPOELE, a citizen of the United States of America, residing at Chicago, in the county of Cook and State of Illinois, have invented certain new and useful Improvements in Cable Conveyances, of which the following is a specification, reference being had therein to the accompanying drawings, in which—

Figure 1 shows a side elevation of the way; Fig. 2, an end view of a car in position, with one end removed; Fig. 3, a detail, in a side elevation, showing the arrangement of the gearing, driving-chains, &c.; Fig. 4, a side elevation of a covered cable, with a car in position, but with the sprocket-wheels and chain shown in the preceding figure removed. Fig. 5 shows, on a larger scale, a section of the cable and negative conductor, with the support for the latter in position. Fig. 6 shows a side view of a support for the cable, to be used in rocky or other suitable localities. Fig. 7 shows a plan of a short section of the covered cable shown in Fig. 4. Fig. 8 shows a side view of some of the sections of the cable-covering. Fig. 9 is a modification of the same. Fig. 10 is a cross-section of the cable and its covering. Fig. 11 is an edge view of one of the pulleys O in Fig. 4. Figs. 12 and 13 are sectional details of different forms of the cable-holders shown in Fig. 4. Fig. 14 is an end view of one of the sections of the cable-covering provided with ears, to receive the link for supporting the negative conductor. Fig. 15 shows two vertical sections of one of the cable-supporting wheels, taken at right angles to each other. Fig. 16 shows a side elevation of one of the terminal supports.

My invention relates to a system of cable-ways, intended more particularly for that class in which electricity forms the motive power, although it may be used with other means of propulsion.

The invention consists in the peculiar combinations and the construction and arrangement of parts hereinafter described and claimed.

Referring to the details of the drawings, A A represent a series of posts, each of which is supplied with a bracket, B, of any suitable form, but preferably like that shown in Fig. 2, and having a cap, b, which fits on the top of the post, and a semicircular curved portion, b', to embrace the post at a lower point, which may be bolted thereto, if preferred. From the center of this bracket runs a cylindrical bar, C, preferably cast in said bracket, which forms an axle for a grooved wheel, D. In the groove of this wheel lies the supporting-cable A, which is preferably an electrical conductor also; and in order that it may the better serve this purpose I prefer to make the interior strands, $e$, of copper, in order that the cable may be a better conductor, and the exterior strands, $e'$, of steel, in order that it may be sufficiently strong to withstand the strain, and durable enough to withstand the wear to which it will be subjected. Below this cable I suspend a conducting-wire, F, for the return-current, preferably in the following manner: Below the cable E, I attach in any convenient manner, as by soldering or otherwise, a series of clips, G, each of which partially embraces the under side of the cable, and is provided with a groove, $g$, in which a link, H, is hung by means of a pin passing through the clip and link. This link carries an insulator, I, and from this insulator hangs another link, J, secured to another clip, G', (similar to clip G, but rather smaller,) which is fastened to the negative conductor F. By this means the cable or positive conductor carries the negative conductor, and yet is perfectly insulated from it. Suspended from the cable is a car, K, of any convenient size, but should be of such dimensions as to have a compartment for the motor and intermediate connections, and a compartment for the material to be carried. This car is preferably suspended by a lever, L, and a series of links, M N N, carrying pulleys O, which are firmly attached to shafts P, running in bearings in the top of the links M. Each of these shafts carries a sprocket-wheel, Q, on which, and on another sprocket-wheel, R, runs a flat drive-chain, S. The wheel R is keyed fast on a shaft, T, that carries a gear, U, which meshes with a pinion, V, of an electro-motor, W, or any other suitable driving mechanism.

The arrangement of the levers and links above referred to will be found to be the preferable arrangement where the way is arranged to run from a higher to a lower level, or the reverse; but where the way is comparatively level the lever L will be found unnecessary, as in that case each of the links M may be provided with a flange at its lower end, by which it may be fixedly connected to the car, as shown in dotted lines in Fig. 2.

For ordinarily level ways, or where only slight inclines are found, a plain cable can be used to considerable advantage; but where there is a very steep incline the construction of cable shown in Figs. 4 and 7 will be preferable. In this case the cable will be covered with a series of malleable castings, which I denominate "steps." These are represented at X X, and, as will be seen on the detail, Fig. 7, each consists of a short tube fitting closely around the cable, and provided with lugs or cogs $x$ on each side, for a purpose hereinafter referred to. One end of each of these steps is provided with tongues or projections $x'$, while the other end has notches $x^2$ of corresponding size, so that when a series of them are set on a cable they are incapable of turning independently.

Instead of making the steps with tongues and notches, as shown in Fig. 8, they may be "halved" one into the other, as shown in Fig. 9, and by making the longitudinal edges of the joints inclined, as shown in said figure, they will become tightened upon the cable as they are driven together.

For the sake of lightness and economy of material, I propose to make them open at top and bottom, as shown at $x^3$ in Fig. 7, although this is not essential.

At the beginning and end of each incline will be placed a holder, (shown at Y Y',) through which the cable passes, and which is provided on each side with lugs $x$ at distances apart corresponding to the lugs $x$ on the steps X. These holders are made in two pieces, which may be either made in the form shown in section in Figs. 12 and 13, in one of which, Fig. 12, one of the parts is made hook-shaped, and the other section is formed to fill in the circle and having an extension downward, by which it is fastened to the larger piece by means of bolts passing through both. The other form is made as shown in cross-section in Fig. 13. In both cases the holder is preferably secured to an arm corresponding to the arm C, projecting from a post similar to A, on which it is secured by means of a nut, which also serves the purpose of securing the two parts together. One end of the holder is provided with a tongue and the other with a notch, corresponding to the tongue and notch on the steps, the object of which is to prevent the steps on the cable from turning. When these steps are used, instead of soldering the clips G to the positive cable E, I have ears cast on the bottom of some of the steps, in which are secured one of the rods H for carrying the negative conductor F.

With this form of cable I propose to use pulleys like that shown in side view at O in Fig. 4 and edgewise in Fig. 11, having a central groove, $o$, adapted to fit an ordinary cable, like that shown in Figs. 1 and 2, and teeth $o'$ on each side, adapted to pass between the cogs on the steps, as shown in Fig. 4.

In some cases, in lieu of using posts to support the wheels D or holders Y, I propose to use the device shown in Fig. 6, where the locality is suitable, such as the sides of hills or mountains. In this case 1 represents a round iron bar, which is driven and wedged into a hole drilled into the side of a rock, and which may be stayed in any convenient manner, but preferably by means of a brace, 2, having the lower half of a box, 3, cast on its top, which is provided with a cap, 4, securely bolted to it, which clamps the bar and brace 1 and 2 fast together. On this is secured one of the supporting-wheels D in any convenient manner.

At the terminal stations I intend to use a support substantially like that shown in Fig. 16, in which 5 represents an upright secured by angle-irons 6 to a cross, 7, preferably made of I-shaped iron, strongly bolted to a masonry foundation, 8, and braced from side movement by four diagonal braces, 9, extending from near the top of the upright to near the end of each arm of the cross. On the top of the upright is secured one of the pulleys or wheels D, over which the cable E is brought and its end passed through a turn-buckle, 10, provided with a screw, 11, which is secured to one arm of the base or cross 7 in any convenient way, but preferably by a bolt passing through an eye formed in the lower end of the screw, as shown. This arrangement of the terminal support will be found to be a very convenient one, as it will be found to be very firm, and will allow of the ready tightening of the cable when necessary; but it is obvious that it may be varied essentially at the will of the constructors.

The wheels D may be made in any known manner; but I prefer to make them with a central hub to receive the supporting-bar, and with side flanges, 8, of thin Bessemer steel, within which is clamped segments of wood with the grain radiating from the center, so that the wear comes on the end of the grain.

To connect the negative conductor F with the motor, I prefer to use a pulley, 5', grooved to approximately correspond inversely with the bottom of the conductor, which pulley is set in a spring-bearing, 6', which may be of any approved form, and which bearing is in electrical connection with the negative pole of the motor.

The course of the current is as follows: The current passes from the positive or supporting cable through the pulleys O, shaft P, links M, lever L, and shaft I, by any suitable conductor, to the positive brush of the motor, through the motor, and from it to the negative conductor F, through the bearing 6' and pulley 5', as above described.

I do not limit myself to the exact construction above set forth, as it is evident that it may be varied without departing from the spirit of my invention.

By the construction here shown, as is evident, a very convenient system of conveyance is provided, which will be found particularly advantageous in mining or mountainous countries, or where the surface of the ground is much broken or uneven.

It is evident that the plain uncovered cable may be used on the level portions of the line, and that the covering or steps need only be used at such points where the incline is very great, as the wheel shown in Fig. 11 will run and propel the car equally well whether on the uncovered level cable or on the inclined step-covered cable.

I wish it to be understood that I do not limit myself to the exact form of cable-covering or steps shown herein, as it is evident that other forms may be used without departing from the spirit of my invention.

I have shown the highest part of the inclined cable-supporter on a post; but it is evident that in most cases it will be most convenient to use a device like that shown in Fig. 6.

Some of the features herein shown and described are not claimed herein, but form the subject-matter of another application filed by me June 29, 1885, Serial No. 170,112.

What I claim as new is—

1. A cable provided with a series of covering-sections having projecting cogs, substantially as described.

2. A cable provided with a series of covering-sections having projecting cogs, and means, substantially as described, to prevent their turning when in position on the cable, as set forth.

3. In a system of cable conveyance, a cable having covering-sections provided with cogs, in combination with a driving-pulley running thereon, and provided with teeth acting on said cogs and driven by any suitable power, substantially as described.

4. In a system of cable conveyance, a cable having covering-sections provided with cogs, in combination with a pulley running thereon provided with a groove adapted to run on the uncovered cable, and having teeth to act on said cogs, substantially as described.

5. In a system of cable conveyance, an inclined cable-way, a car supported by said cable, a lever pivoted in said car, driving-pulleys running on the cable, links forming bearings for the pulleys and having their lower ends connected to the lever, and a link between the pulleys to equalize the distance, substantially as described.

6. In a system of cable conveyance, a cable having different portions on different planes, provided with a supporting-holder having its bearing surface curved lengthwise of the cable, and provided with cogs, as $x$, substantially as described.

7. In a system of cable conveyance, a cable having a covering provided with cogged steps, and a holder for the cable provided with cogs corresponding to those on the steps, substantially as described.

8. In a system of cable conveyance, and as a means of supporting the cable on rocky localities, a bracket consisting of the rod 1, the brace 2, and the box 3 and 4, for clamping the two together, substantially as described.

9. In a system of cable conveyance, a cable-holder provided with cogs, substantially as described.

10. In a system of cable conveyance, a terminal support consisting of a base, 7, an upright, 5, and a carrying-roller, D, in combination with a cable, and a turn-buckle connected to said base and cable, substantially as and for the purpose specified.

In testimony whereof I affix my signature, in presence of two witnesses, this 27th day of June, 1885.

CHARLES J. VAN DEPOELE.

Witnesses:
T. J. W. ROBERTSON,
PHILIP MAURO.